(12) United States Patent
Zimmerman (10) Patent No.: US 9,908,722 B2
(45) Date of Patent: Mar. 6, 2018

(54) TOP MOUNTED SILO UNLOADER WITH BELT CONVEYOR DISCHARGE

(71) Applicant: Marvin B. Zimmerman, Oakland Mills, PA (US)

(72) Inventor: Marvin B. Zimmerman, Oakland Mills, PA (US)

(*) Notice: Subject to any disclaimer, the term of this patent is extended or adjusted under 35 U.S.C. 154(b) by 0 days.

(21) Appl. No.: 15/082,082

(22) Filed: Mar. 28, 2016

(65) Prior Publication Data

US 2016/0304297 A1 Oct. 20, 2016

Related U.S. Application Data

(60) Provisional application No. 62/147,811, filed on Apr. 15, 2015.

(51) Int. Cl.
*B65G 65/38* (2006.01)
*B65G 65/22* (2006.01)
*A01F 25/20* (2006.01)

(52) U.S. Cl.
CPC .......... *B65G 65/38* (2013.01); *A01F 25/2009* (2013.01); *B65G 65/22* (2013.01)

(58) Field of Classification Search
CPC ........ B65G 65/38; B65G 65/22; B65G 33/14; A01F 25/2009
See application file for complete search history.

(56) References Cited

U.S. PATENT DOCUMENTS

| | | | | |
|---|---|---|---|---|
| 1,479,990 A | * | 1/1924 | Keys ................... | A01F 25/2009 182/128 |
| 2,719,058 A | * | 9/1955 | Van Dusen ............ | B65G 65/38 222/252 |
| 2,876,043 A | * | 3/1959 | Van Dusen ............ | B65G 65/38 406/70 |
| 3,146,899 A | * | 9/1964 | Bruecker ............... | B65G 65/38 414/313 |
| 3,223,256 A | * | 12/1965 | Buschbom .......... | A01F 25/2009 406/59 |
| 3,229,827 A | * | 1/1966 | Kucera ............... | A01F 25/2009 198/592 |
| 3,462,199 A | * | 8/1969 | Downing ............... | B65G 65/38 198/493 |
| 3,522,971 A | * | 8/1970 | Buschbom .......... | A01F 25/2009 301/43 |
| 3,539,059 A | * | 11/1970 | Buschbom .......... | A01F 25/2009 193/17 |

(Continued)

*Primary Examiner* — Kaitlin S Joerger
(74) *Attorney, Agent, or Firm* — Miller Law Group, PLLC (57) ABSTRACT

A top mounted silo unloader utilizes a belt conveyor to move collected silage from the center of the silo structure to the door of the silo chute for discharge of the silage from the silo. The silo unloader uses a vertical auger mounted on top of the silage collection apparatus to receive silage therefrom and elevate the silage for discharge onto the belt conveyor for discharge from the silo. The silage collection apparatus includes an auger and an inboard paddle to discharge silage into the vertical auger. The belt conveyor includes a height adjustment mechanism that facilitates alignment of the belt conveyor with a selected door where a support member engages the door sill to keep the belt conveyor aligned as the silo unloader lowers with the depletion of silage from the surface as the belt conveyor is pivotally supported from the unloader frame to permit vertical movement.

19 Claims, 7 Drawing Sheets

(56) References Cited

U.S. PATENT DOCUMENTS

| | | | | |
|---|---|---|---|---|
| 3,651,910 A * | 3/1972 | Buschbom | ........... | A01F 25/2009 193/17 |
| 3,653,520 A * | 4/1972 | Milchner | ............... | B65G 65/38 406/57 |
| 3,713,551 A * | 1/1973 | Moen | .................. | A01F 25/2009 414/298 |
| 3,968,998 A | 7/1976 | Wolf | | |
| 3,980,186 A | 9/1976 | Leith | | |
| 4,057,151 A | 11/1977 | Weaver | | |
| 4,114,748 A * | 9/1978 | Schulte | ............... | A01F 25/2009 193/33 |
| 4,227,836 A * | 10/1980 | Sizelove | ............ | A01F 25/2009 406/114 |
| 4,230,221 A | 10/1980 | Beresinsky | | |
| 4,242,028 A * | 12/1980 | Van Dusen | ............ | B65G 65/38 414/320 |
| 4,329,105 A | 5/1982 | Buschbom et al. | | |
| 4,465,409 A * | 8/1984 | Buschbom | ............. | B65G 65/38 406/114 |
| 4,533,280 A * | 8/1985 | Elliott | .................. | A01F 25/2009 406/107 |
| 4,772,173 A * | 9/1988 | Buschbom | .......... | A01F 25/2009 414/310 |
| 4,890,721 A | 1/1990 | Kamiwaki et al. | | |
| 5,035,317 A * | 7/1991 | Buschbom | ............. | A01D 23/02 198/642 |
| 5,112,180 A | 5/1992 | Hough | | |
| 5,190,140 A * | 3/1993 | Buschbom | ............. | A01D 23/02 198/642 |
| 5,626,218 A * | 5/1997 | Kamiwaki | ............. | B65G 65/22 198/518 |
| 5,642,977 A * | 7/1997 | Hanson | ............... | A01F 25/2009 406/114 |
| 2004/0146381 A1 * | 7/2004 | Hanson | ............... | A01F 25/2009 414/306 |

\* cited by examiner

TOP MOUNTED SILO UNLOADER WITH BELT CONVEYOR DISCHARGE

CROSS-REFERENCE TO RELATED APPLICATIONS

This application claims domestic priority on U.S. Provisional Patent Application Ser. No. 62/147,811, filed on Apr. 15, 2015, the content thereof being incorporated herein by reference.

FIELD OF THE INVENTION

This invention relates generally to devices for unloading forage material from a vertical silo structure and, more particularly, to a silo unloader that utilizes a high speed belt conveyor to move recovered forage material from a vertical auger to the silo chute for discharge of the forage material from the silo.

BACKGROUND OF THE INVENTION

Silo unloaders are operable to loosen forage material that is compacted within a vertical silo structure and remove the loosened forage material from the silo for feeding to animals. Silo unloaders are typically manufactured in two configurations. One configuration is fixed at the bottom of the silo and removes forage material from the bottom of the silo, while the other configuration is referred to as a top unloader in that the silo unloader apparatus is lowered from a storage position within the dome of the silo structure onto the top surface of the compacted forage material.

Top unloading silo unloaders are well known in the art as a method for removing silage from a vertical tower-like silo structure. Silage in the form of chopped feed or crop material, such as corn plants or hay, is loaded into the silo structure typically by blowing the silage material an opening at the top of the silo structure so that the silage material drops to the bottom of the silo and compacts by its own weight until the level of the silage material is near the top of the silo structure. Over time, the forage material loaded into the silo, ensiles and becomes a fermented feed material commonly referred to as silage. When removal of the silage from the silo is desired, such as to feed livestock, particularly cattle, the top unloading silo unloader is lowered from the storage position within the dome of the silo onto the top of the compacted silage material.

A typical example of a top unloading silo unloader can be seen in U.S. Pat. No. 5,642,977, granted on Jul. 1, 1997, to Gregg W. Hanson, et al. Such silo unloaders are mounted for rotation about a circular track. Near the center of rotation of the silo unloader is a blower that receives a supply of dislodged silage material and operates to blow the collected silage material into an opened door of the silo chute. An arm is connected to the sill of the opened door so that the discharge path of the blower is always aimed at the opened door. To collect silage from the top of the compacted supply of silage within the silo, the unloader is provided with an auger mechanism that extends substantially from the center of rotation to the periphery of the silo. This auger mechanism rotates around the silo on the circular track and delivers collected silage to the inlet opening of the blower.

The auger mechanism that collects the silage from the top surface of the compacted silage can be a double auger apparatus, as is disclosed in the aforementioned U.S. Pat. No. 5,642,977, or a single auger mechanism as is taught in U.S. Pat. No. 4,057,151, granted on Nov. 8, 1977, to Richard Weaver. Another configuration of a top unloading silo unloader can be seen in U.S. Pat. No. 4,465,409, granted on August 14, to Floyd E. Buschbom, et al. Other configurations, including both single and double auger silage collection devices, can be found in U.S. Pat. No. 3,968,998, issued to Johann Wolf on Jul. 13, 1976; in U.S. Pat. No. 4,772,173, issued to Floyd E. Buschbom, et al, on Sep. 20, 1988; and in U.S. Pat. No. 4,329,105, issued to Floyd E. Buschbom et al, on May 11, 1982. Each of these top unloading silo unloaders utilize a blower apparatus that uses a significant amount of energy to accelerate the collected silage material to be blown through the opened door of the silo chute for collection at the bottom of the silo structure.

Top loading silo unloaders generally have mechanisms which allow them to be placed within the round silo tower and then rotate or pivot about the center of the tower. Ideally, the auger arm will evenly cut through all of the silage and uniformly remove it from the silo. Because the auger mechanism is rotated around the center of rotation of the silo unloader, the silo unloader will not remove silage from only one side of the silo at a greater rate than the other side, thus creating an uneven or unlevel upper surface of the silage.

A number of things must happen as this auger arm rotates around the silo in order to effectively unload the tower silo. First, the auger arm must evenly remove and cut through the silage as it is removed, which can be difficult to accomplish when the silage is very hard due to either compaction or freezing. Secondly, silage must be evenly removed from the center point so as to avoid the creation of a mound or "plug" at the center or pivot point within the silo below the single auger blower. Also, silage must be removed right up to the walls, thus not leaving additional amounts of silage frozen to or attached to the walls.

Also important in the operation of a silo unloader are all the usual concerns regarding efficient operation (both from a power or energy consumption perspective and a silage transfer rate perspective). Typically, a farmer would like to move silage at a very high rate and use small amounts of power to do so. Also, as farms continue to get larger, it is very important for the farmer to remove silage at a higher rate as more livestock need to be fed.

Another common problem with the top mounted silo unloaders comes from the use of the closed cavity blower. Blowers typically used in silo unloaders are similar to any other fan or blower mechanism used in numerous material transfer situations. Generally, the blower has a rotating shaft with a number of blades attached thereto. The shaft and blades are configured within an enclosed cavity with an inlet port and outlet port. Silage is then fed into the inlet by the auger mechanism, usually through flipping blades or paddles. The silage is engaged by one of the blower blades and is propelled out the blower outlet port.

Particularly with single auger collection mechanisms, the auger draws material toward the center of the silo while advancing in the direction opposite the auger rotation. Situated at the center is the blower mechanism which is positioned such that silage is propelled into its inlet. The auger arm or auger assembly then rotates around the tower silo to evenly and uniformly unload material. As this entire mechanism rotates around, the enclosed bottom portion of the blower assembly tends to contact and compact the silage at the center of the silo. Furthermore, due to the alignment of the auger and transfer blades within the silo, this compacted material is not usually engaged by the auger. Therefore, a compacted mound is created which cannot be easily removed by the silo unloader.

In summary, the single auger collection mechanism has been underutilized in favor of the double auger collection mechanism to provide greater aggressiveness to break up compacted or frozen silage, and to prevent the creation of a compacted mound or hill at the center point of the silo under the blower. However, the use of a double auger collection mechanism is more expensive to manufacture as a greater amount of material and labor is required to form two augers instead of a single auger.

Nevertheless, the double auger collection mechanism does provide some advantages in operation over the single auger configuration. The double auger mechanism is desirable in removing compacted or frozen silage as the two augers can work in conjunction with one another to very aggressively break up the silage. Usually, the two augers will be placed parallel one another and will be configured to rotate in opposite directions in collecting the silage material. By rotating in opposite directions, the augers will not tend to pull the auger arm in any specific direction. Stated alternatively, the pulling forces created by the rotation of each auger will tend to cancel out one another. Further, the two augers can be sized differently so as to cut at different depths, which creates more efficiency because each auger is attempting to shave off only a limited amount of material thus allowing the second auger to cut a little deeper. Conversely, the double auger collection mechanism can be too aggressive during operation and has a tendency to pull the unloader apparatus off center.

However, not all silo structures are provided with a vertical chute along the side of the silo structure provided with a plurality of vertically spaced doors through which the collected silage can be blown for collection at the bottom of the chute. Some silos are formed with a central discharge chute, as is disclosed in U.S. Pat. No. 5,112,180, issued on May 12, 1992, to Richard M Hough, for which a rotating scraping mechanism is provided to collect silage from the compacted supply around the central discharge chute. The scraper mechanism moves the silage through openings in the central discharge chute as the mechanism is rotated. The scraper mechanism is suspended by cables from the top of the silo and can operate on demand until the silo is ultimately emptied.

Another silo configuration is disclosed in U.S. Pat. No. 3,980,186, granted on Sep. 14, 1976, to Duane A. Leith, in which the discharge chute is formed along the inside of the silo by a semi-circular member that keeps silage material from being placed along the formed discharge chute. As silage material is loaded into the silo structure during harvest time, the silage handling apparatus is winched upwardly to stay on top of the silage material being loaded. As a result, the compacted silage maintains a formed chute along the inside of the silo as created by the semi-circular member. When collection of the compacted silage material is desired, the silage handling apparatus is rotated to scrape silage material off of the top surface and then move the collected silage material into the formed discharge chute.

Further complicating the use of blower-type silo unloaders is the tendency for silos to be constructed in larger, greater diameter configurations. Where silos having a diameter of twenty feet are easily adaptable to having a blower move collected silage to an open chute door, larger diameter silos, particularly silos that can be built in the range of a forty foot diameter configuration, present too great of a distance for forage to be accurately and efficiently blown along a trajectory that will effectively hit the open door to the discharge chute. Accordingly, an improved top mounted silo unloader would be desirable so that larger diameter silos can be constructed without the limitations of the unloading apparatus restricting the effective size.

Bulk material conveyors also utilize an auger collection mechanism, in either single auger or double auger configurations, such as is disclosed in U.S. Pat. No. 4,230,221, granted to Isaac Beresinsky on Oct. 28, 1980, showing a single auger collector, and in U.S. Pat. No. 4,890,721, granted to Tadayoshi Kamiwaki on Jan. 2, 1990, showing a double auger collector. These bulk material conveyors incorporate a pair of opposing, material clamping, juxtaposed conveyor belts that receive the bulk material discharged from the auger collector between the opposing conveyor belts to elevate the bulk material vertically and then horizontally for discharge to a remote location.

It would be desirable to provide an improved top mounted silo unloader that would overcome the disadvantages of the prior art silo unloaders and provide an effective silage unloading capability that will enable the construction of larger diameter silo structures.

SUMMARY OF THE INVENTION

It is an object of this invention to overcome the disadvantages of the prior art by providing a top mounted silo unloader utilizing a belt conveyor to conveyor collected silage to the silo chute for discharge from the silo.

It is another object of this invention to overcome the disadvantages of the prior art by providing a top mounted silo unloader utilizing a vertical auger to elevate collected silage to a discharge apparatus that conveys the collected silage to the silo chute for discharge from the silo.

It is a feature of this invention that the vertical auger is supported above a vertical discharge opening in the silage collection apparatus which pushes collected silage vertically into the vertical auger.

It is an advantage of this invention that the axis of rotation of the silage collection apparatus corresponds to the vertical axis of the vertical auger.

It is another feature of this invention that the silage collection apparatus has a mounting structure that is rotatably supported on the housing of the vertical auger so that the silage collection apparatus rotates around the vertical auger.

It is another advantage of this invention that the vertical discharge opening of the silage collection apparatus is always vertically aligned with the opening in the bottom of the vertical auger to receive collected silage therefrom.

It is another advantage of this invention that the use of the vertical auger eliminates a build-up of collected silage at the pivot for the silage collection apparatus.

It is another feature of this invention that the belt conveyor has a support member engagable with a door sill on the silo chute.

It is another advantage of this invention that the belt conveyor remains aligned with the opened chute door as the top mounted silo unloader moves downwardly with the depletion of silage within the silo.

It is still another feature of this invention that the belt conveyor is provided with a height adjustment mechanism that is selectively engagable with the top mounted silo unloader frame to facilitate the positioning of the belt conveyor.

It is still another feature of this invention that the vertical auger incorporates a side discharge apparatus that moves silage elevated by the vertical auger onto the belt conveyor for discharge through the silo chute.

It yet another feature of this invention that the silage collection apparatus includes a horizontally disposed auger that engages the surface of the silage within the silo to collect silage and convey the collected silage to the vertical auger.

It is still another advantage of this invention that the horizontally disposed auger has a discharge paddle mounted at the inner end thereof to discharge collected silage vertically into the vertical auger.

It is still another object of this invention to provide a top mounted silo unloader that is not limited in operation to the size of the silo diameter.

It is yet another advantage of this invention that the belt conveyor carries the collected silage from the center of the silo to the selected door on the silo chute.

It is a further feature of this invention that the belt conveyor does not require the collected silage to be hurled from the center of the silo structure to reach the silo door for discharge to the silo chute.

It is still another object of this invention to provide a top mounted silo unloader that collects and discharges silage through a silo chute door which is durable in construction, inexpensive of manufacture, carefree of maintenance, facile in assemblage, and simple and effective in use.

These and other objects, features and advantages are accomplished according to the instant invention by providing a top mounted silo unloader that utilizes a belt conveyor to move collected silage from the center of the silo structure to the door of the silo chute for discharge of the silage from the silo. The silo unloader uses a vertical auger mounted on top of the silage collection apparatus to receive silage therefrom and elevate the silage for discharge onto the belt conveyor for discharge from the silo. The silage collection apparatus includes an auger and an inboard paddle to discharge silage into the vertical auger. The belt conveyor includes a height adjustment mechanism that facilitates alignment of the belt conveyor with a selected door where a support member engages the door sill to keep the belt conveyor aligned as the silo unloader lowers with the depletion of silage from the surface as the belt conveyor is pivotally supported from the unloader frame to permit vertical movement.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENTS

Referring now to drawings, a top mounted silo unloader incorporating the principles of the instant invention can best be seen. The silo unloader 10 is formed with a tri-mount frame 11 that includes frame members 12 connected to one another to form a central triangle where the central vertical auger 20 is located. The tri-mount frame members 12 extend outwardly from the central vertical auger 20 to distal ends located inwardly from the circumference of the silo structure 1. Each distal end of the tri-mount frame members 12 are attached to a cable 13 that extends vertically therefrom to engage a winch mechanism (not shown), as will be understood by one of ordinary skill in the art. The winch mechanism (not shown) controls the raising and lowering of the silo unloader 10 in a conventional manner. Depending on the spatial requirements of the silo and the respective components of the silo unloader 10, the silo unloader 10 may also require a secondary frame 15 that connects between the tri-mount frame 11 and the other supported components of the silo unloader 10.

The silo unloader 10 is also formed with a circular track 17 that is secured to the secondary frame 15, if utilized, and therefore, also to the tri-mount frame 11 so as to be fixed in position with respect to the silo structure 1. A silage collection apparatus 20 is supported underneath the circular track 17 and includes a rotary truck 18 that engages the circular track 17. An electric motor 19 provides operative power to the rotary truck 18 so that the truck 18 traverses along the arc defined by the circular track 17 to rotate the silage collection apparatus 20 around a central pivot axis 32. The silage collection apparatus 20 preferably includes a single auger 22 that engages the top of the compacted silage 3 stored within the silo structure 1. The silage collection apparatus 20 can include a pair of counter-rotating augers (not shown) that provide the same function as described in greater detail below with respect to the single auger configuration.

The silage collection apparatus 20 is connected to the central pivot axis 32 so that the rotary truck 18 slowly progresses the silage collection apparatus 20 in a circular path corresponding to the center of the silo structure 1. As the silage collection apparatus 20 proceeds along the arcuate path of travel, the auger 22 (or dual cooperating augers) engage the top surface of the compacted silage material 3 within the silo 1 to loosen an amount of silage material 3 and then convey the silage material inwardly toward the central pivot axis 32 for subsequent handling, as will be described in greater detail below. The silage collection apparatus 20 also includes a pair of guide wheels 24 at the distal end of the silage collection apparatus 20 to engage the interior surface of the silo structure 1, and a scraper member 25 connected to the end of the auger 22 for rotation therewith, whereby the scraper member 25 will remove remnant silage material, such as frozen material, from the interior surface of the silo structure 1.

Figure 1:
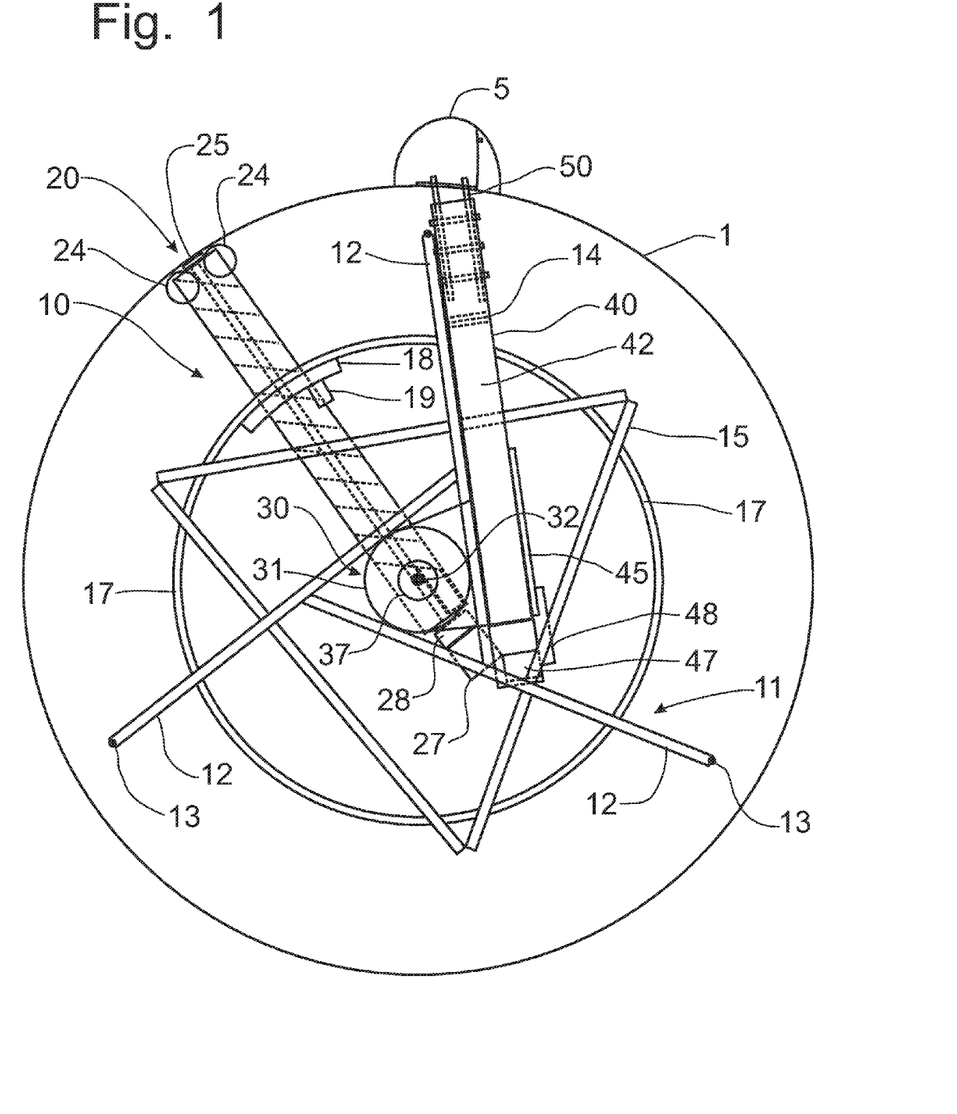
FIG. 1 is a schematic top plan view of the top mounted silo unloader incorporating the principles of the instant invention, the perimeter of the silo being schematically shown as the outer circle with a semi-circular silo chute located on the outer periphery of the silo structure.
Figure 2:
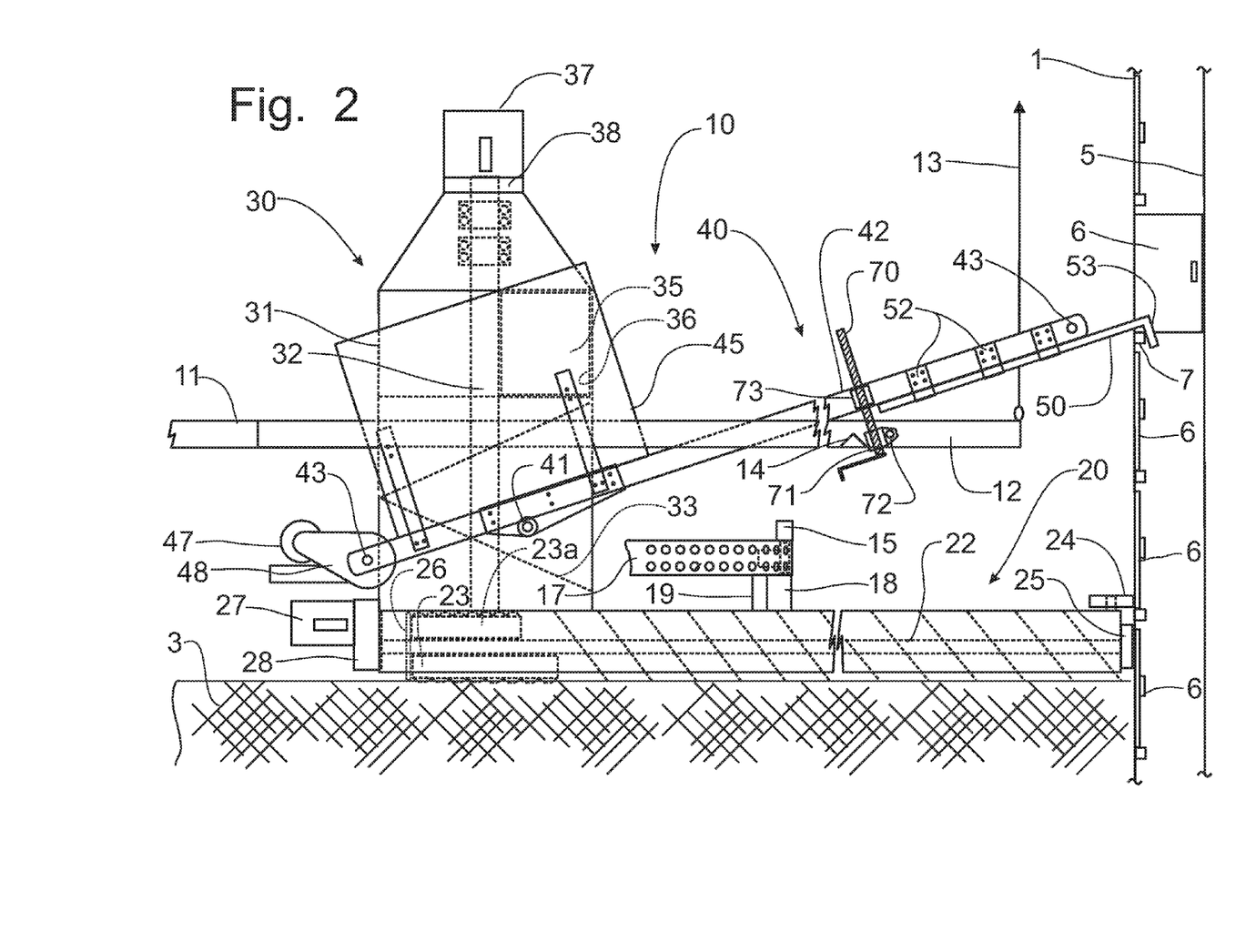
FIG. 2 is a schematic partial elevational view of the top mounted silo unloader shown in FIG. 1.
Figure 8:
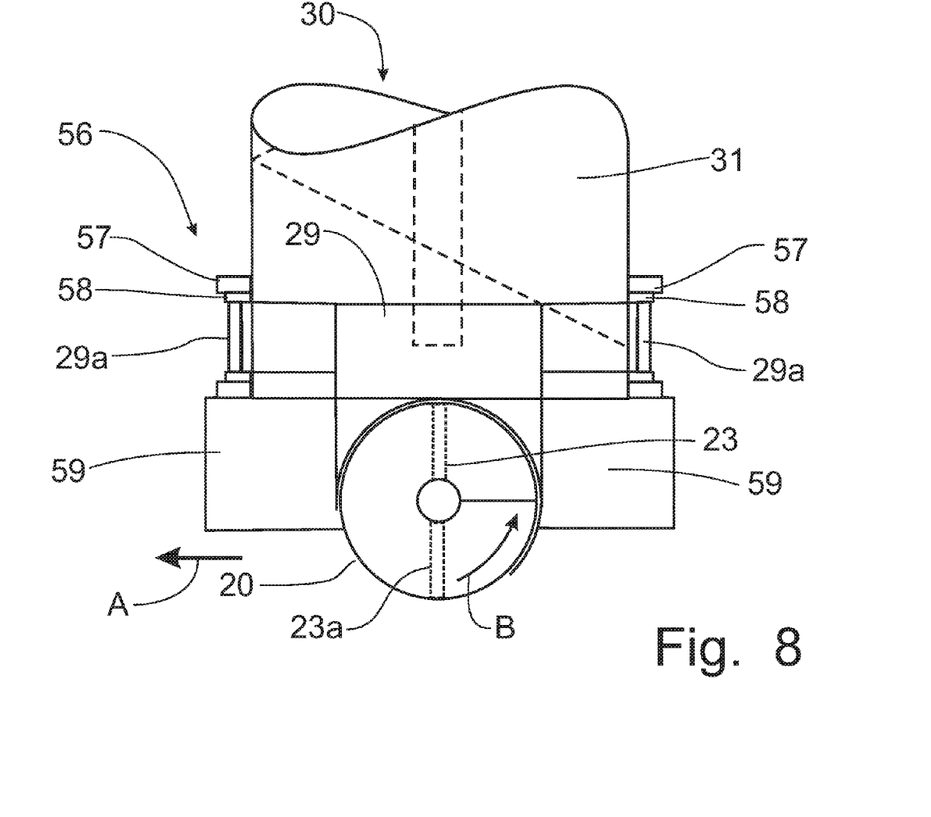
FIG. 8 is a partial cross-sectional view taken along lines 8-8 in FIG. 7 to show a front elevational view of the support apparatus mounting the silage collection mechanism to the central vertical auger.

The silage collection apparatus 20 is preferably powered by an electric motor 27 and associated gearbox 28 mounted on the inner end of the silage collection apparatus 20 to provide rotational movement for the auger 22 and the scraper member 25. As is best seen in FIGS. 2 and 8, the bottom of the outer housing 21 for the auger 22 is open to expose the engagement of the auger 22 into the stored silage material 3 compacted in the silo 1. The outer edges of the flighting for the auger 22 can have harden knives (not shown) attached to the flighting to enhance the digging and collection of the compacted silage material 3. The inboard end of the auger 22 includes at least one auger paddle 23, whose primary function is described in greater detail below, but preferably the edge of the auger paddle 23 will also be formed with hardened teeth that will dig into the surface of the compacted silage 3 with ever revolution of the auger 22. Preferably, a second auger paddle 23a will be located on the opposite side of the auger shaft and extending about three-quarter's of the length of the primary auger paddle 23.

A central vertical auger 30 is provided at the center of the silo unloader 10 to receive collected silage material from the silage collection apparatus 20 and to elevate the collected silage material to a belt conveyor 40 for discharge from the silo, as will be described in greater detail below. The central vertical auger 30 is rotatable about the central shaft 32 which corresponds to the central pivot axis 32 for the rotation of the silage collection apparatus 20. The central vertical auger 30 is preferably 24 inches in diameter and projects upwardly approximately four feet. The lower half of the central vertical auger 30 is formed with a single auger flighting 33 that makes preferably a 360 degree turn, i.e. a full flight rotation. The upper half of the central vertical auger 30 includes a paddle 35. An electric motor 37 and an appropriate gearbox 38 provide operative power to rotate the central vertical auger 30.

The inner end of the auger 22 is formed with a stop plate 26 that facilitates the operation of the paddles 23, 23a to project upwardly the collected silage material conveyed by the auger 22 for reception by the vertical auger 30. In some situations, the stop plate 26, which rotates with the auger 22, will be formed with hardened teeth (not shown) to facilitate the loosening of the compacted silage material 3. With the central vertical auger 30 located directly over top of the inner end of the auger collection apparatus 20, the auger paddles 23, 23a pushes the collected silage material 3 delivered by the auger 22 upwardly into the housing 31 of the central vertical auger 30 where the collected silage material is engaged by the rotating auger flighting 33 and conveyed upwardly to the upper portion of the housing 31. The smaller secondary auger paddle 23a is positioned to pick up any silage material that was not projected into the vertical auger 30, such as when the vertical auger flighting 33 blocks silage propelled upwardly by the primary auger paddle 23.

The upper portion of the housing 31 has mounted onto the shaft 32 of the vertical auger 30 a discharge paddle member 35 that is operable to project the collected and elevated silage material outwardly from the housing 31 through an opening 36 in the side of the housing 31. The belt conveyor 40 is positioned to receive the collected silage material discharged from the central vertical auger 30 by the paddle member 35. The belt conveyor 40 is supported by the tri-mount frame 11 for vertical movement about a pivot axis 41. The belt conveyor 40 is formed in a generally conventional manner with an endless belt 42 entrained around rollers 43 at opposing ends of the conveyor 40 to provide a moving belt surface that carries material toward the distal discharge end of the belt conveyor 40. The movement of the belt 42 is powered by an electric motor 47 and an appropriate gearbox or other power transfer mechanism 48 to provide operative power for the movement of the belt 42. The frame of the belt conveyor 40 is provided with a deflector panel 45 that is mounted on the opposite side of the belt conveyor 40 from the opening 36 in the central vertical auger 30 to deflect the silage material conveyed outwardly from the housing 31 by the paddle member 35 onto the surface of the moving belt 42.

The distal end of the belt conveyor 40 is provided with a support apparatus 50 slidably received in brackets 52 mounted on the frame of the belt conveyor 40. The support apparatus 50 is formed with a hook portion 53 that is engageable over the bottom edge or sill 7 of an opening in the silo structure 1 where a door 6 can be opened to provide access into the silo chute 5. The function of the support apparatus 50 is to keep the distal discharge end of the belt conveyor 40 aligned with the door opening 6 so that the collected silage material on the conveyor belt 42 is passed through the door opening 6 and into the chute 5, irrespective of the pivot angle of the belt conveyor 40 about the pivot 41.

Preferably, the belt conveyor 40 is provided with a mechanism 70 for raising and lowering the distal end of the conveyor 40 for alignment with a silo door 6. Such a mechanism 70 needs to permit the automatic movement of the belt conveyor 40 about the pivot 41 as the silo unloader 10 removes silage material 3 from the silo, and therefore lowers relative to the silo, while the hook portion 53 at the distal end of the belt conveyor 40 to secure to the silo. One such mechanism 70 could be a manually operated screw jack 70 that has a base bracket 71 that can be selectively coupled by a removable pin 72 to the frame support 12, 15 for operation and a swivel bracket 73 connecting the screw jack 70 to the frame of the belt conveyor 40. Once the distal end of the belt conveyor 40 is properly position and the hook portion 53 is engaged on the door sill 7, the pin 72 needs to be disconnected so that the belt conveyor is free to pivot about the pivot 41 as the silo unloader 10 lowers. One skilled in the art will recognize that the manual screw jack 70 is an exemplary mechanism that could be mechanized by an electric actuator, or hydraulic or pneumatic actuator is such power sources were respectively available.

Figure 3:
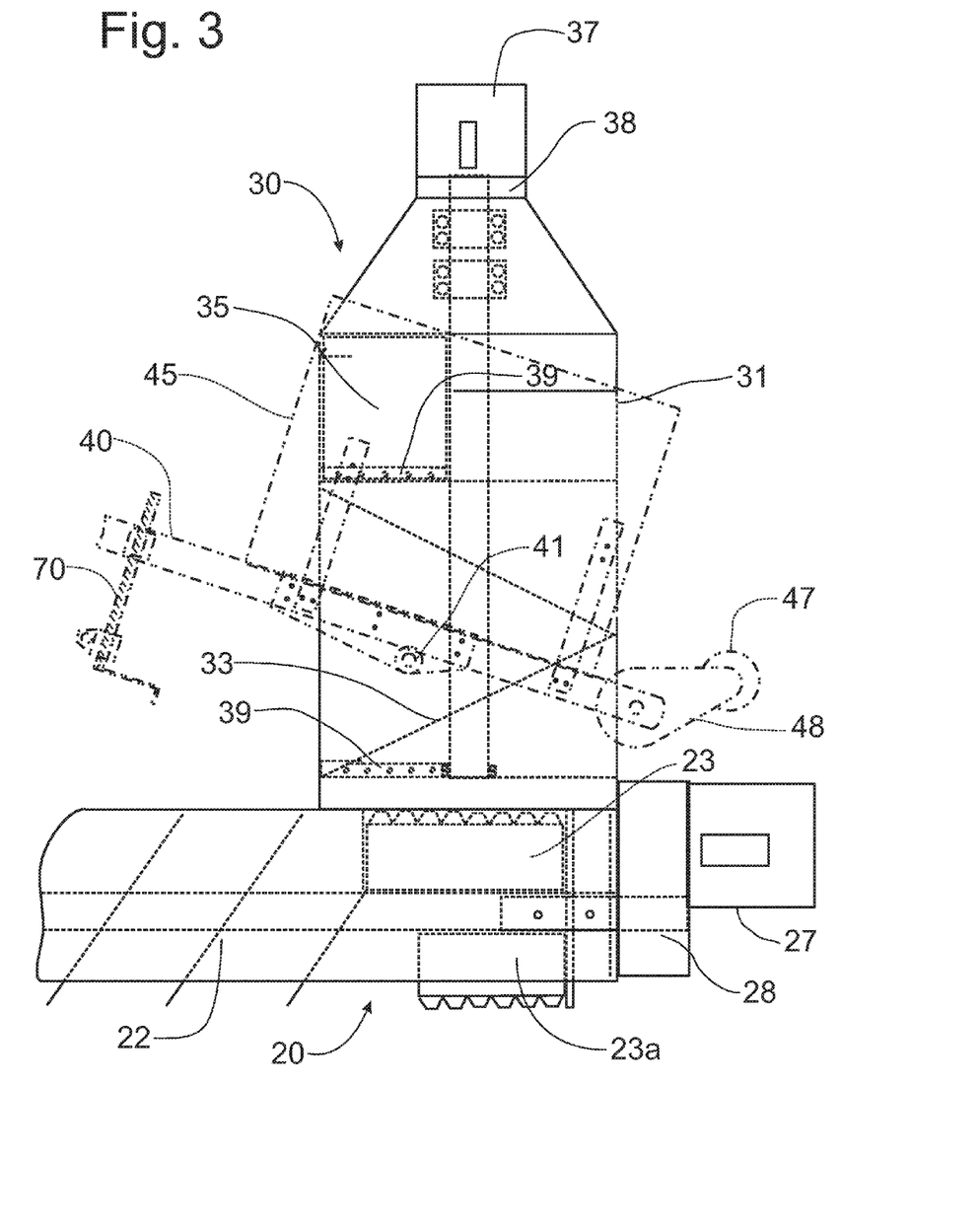
FIG. 3 is an enlarged schematic cross-sectional view of the central vertical auger cooperating with the laterally extending horizontal silage collection auger, the location of the belt conveyor being shown in phantom.
Figure 4:
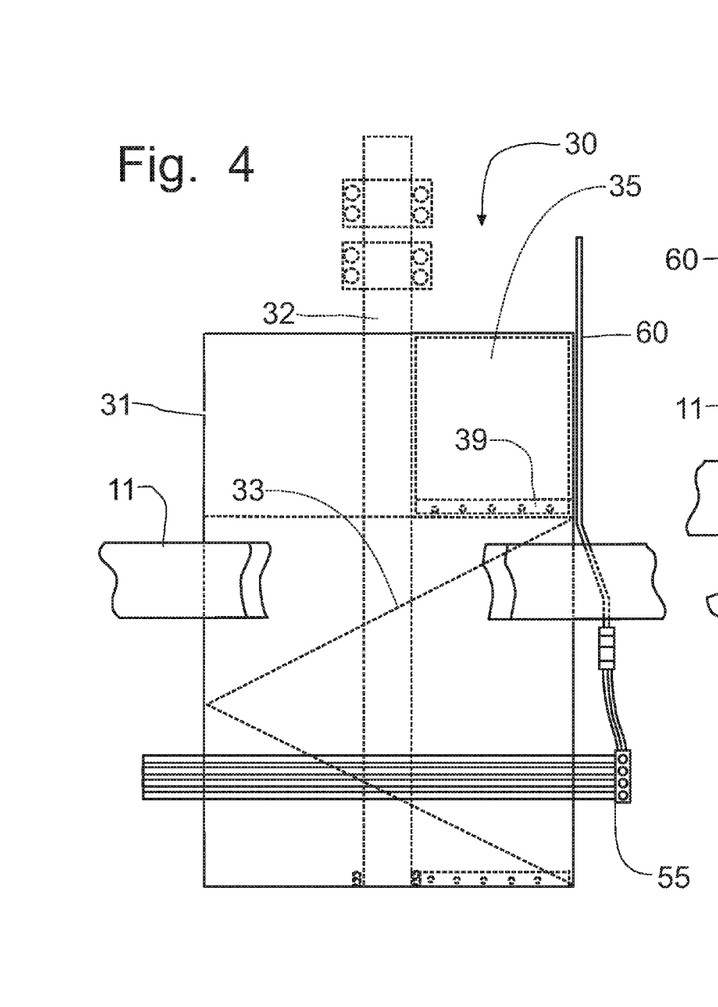
FIG. 4 is an enlarged schematic elevational view of the central vertical auger corresponding to the side of the central vertical auger opposite from the belt conveyor.
Figure 5:
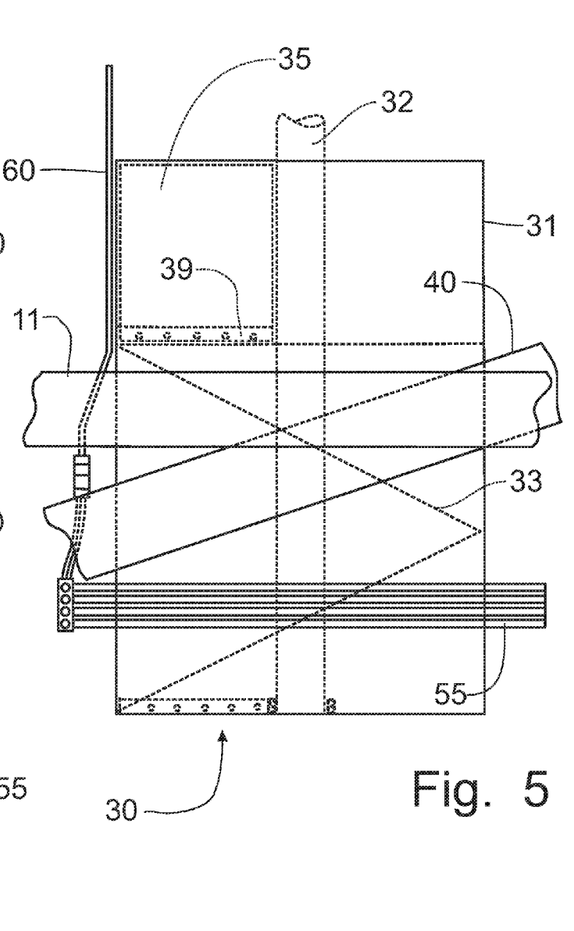
FIG. 5 is an enlarged schematic elevational view of the central vertical auger corresponding to the side of the central vertical auger having the belt conveyor adjacent thereto.

Referring now to the details of the relationship of the silage collection apparatus 20 and the central vertical auger 30 as shown in FIGS. 3-5, one skilled in the art can see that the auger paddles 23, 23a project the collected silage material upwardly into the bottom of the housing 31 where the silage material is engaged by the auger flighting 33 to be elevated to the upper half of the housing 31, at which point the discharge paddle member 35 discharges the collected silage material onto the conveyor belt 42. Preferably, the upper end of the auger paddles 23, 23a and the lower end of the auger flighting 33 and the lower end of the paddle member 35 are provided, respectively, with a replaceable wear strip 39. Electrical power is delivered by wiring 60 to a circular carrier 55 operatively connected to the circular track 17 to provide electrical power to the electric motor 19 driving the rotary truck 18 that causes movement of the silage collection apparatus 20. Power for the other electric motors 27, 37 and 47 are provided through the same source of electricity 60.

Figure 6:
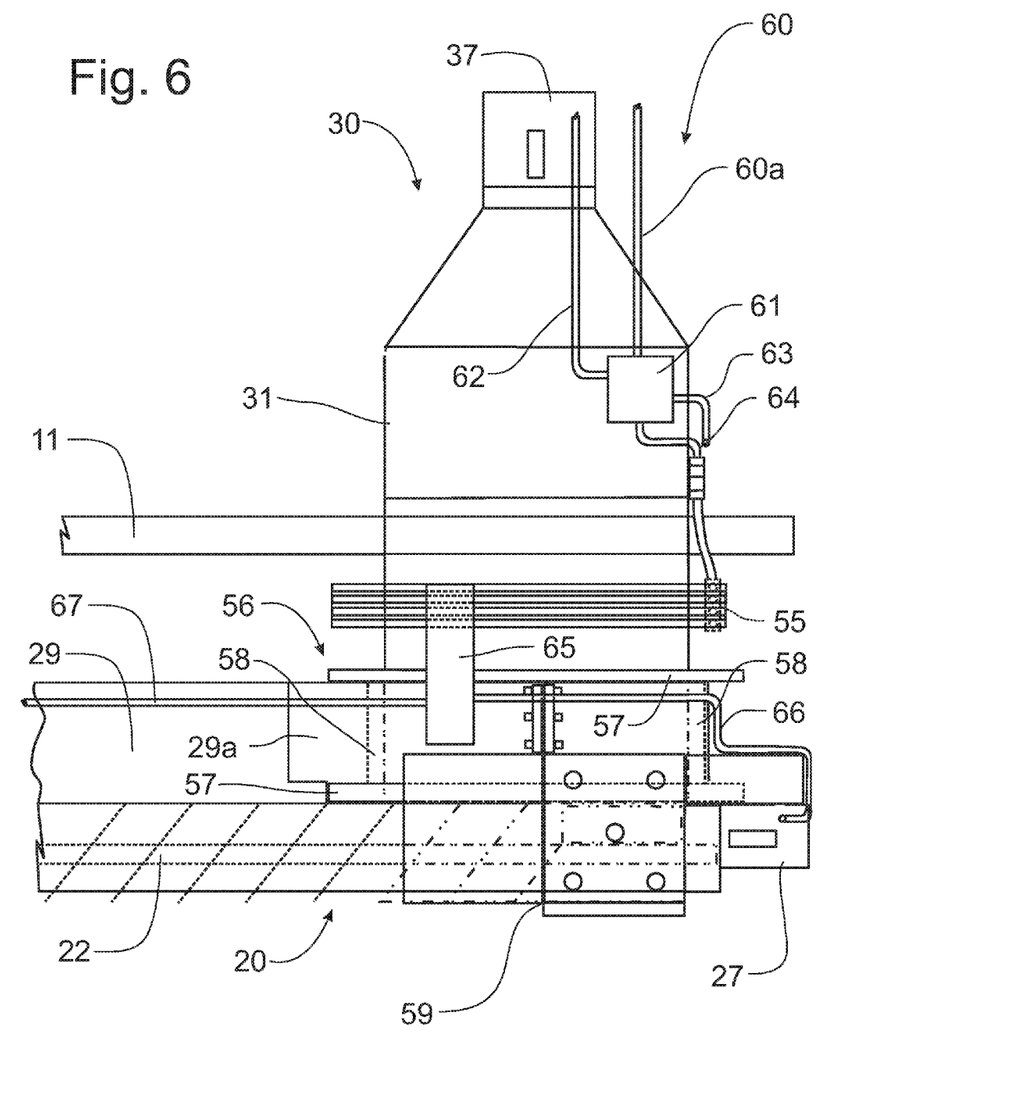
FIG. 6 is an enlarged detail view of the exterior of the central auger rotatably supporting the silage collection apparatus, showing a schematic of the electrical circuit providing power to the operative components.
Figure 7:
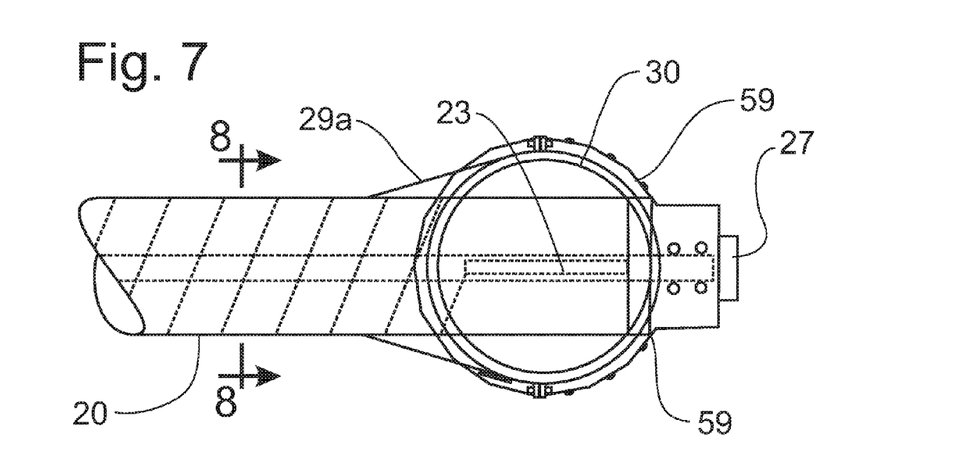
FIG. 7 is a schematic partial cross-sectional view taken horizontally through the central vertical auger to show the preferred embodiment of the support apparatus mounting the silage collection mechanism to the central vertical auger.

The rotational support of the silage collection mechanism 20 about the central vertical auger 30 can be accomplished as depicted in FIGS. 6-8. The housing 31 of the central vertical auger 30 can be formed as a cylindrical sleeve having a support bracket 56 that includes a support flange 57 carrying a plastic bushing 58. The silage collection mechanism 20 includes a frame member 29 that is mounted on the top portion of the horizontal auger 22 and includes a band member 29a that wraps around the housing 31 of the central vertical auger 30. The band member 29a is engaged with the plastic bushing 58 to provide the ability to rotate such that the band member 29a is mounted on the support bracket 56 for rotation around the bottom of the housing 31, which is open to receive collected silage propelled upwardly by the paddle members 23, 23a. An auger and motor support member 59 keeps the horizontal auger 22 secured to the bottom of the housing 31 so as to receive the collected silage from the horizontal auger 22. Alternatively, a lower portion of the housing 31 could be fixedly secured to the silage collection mechanism 20 and rotatably supported in a similar manner from an upper portion of the housing 31 so that the lower portion of the housing 31 would rotate with the silage collection mechanism 20.

Figures 9, 10:
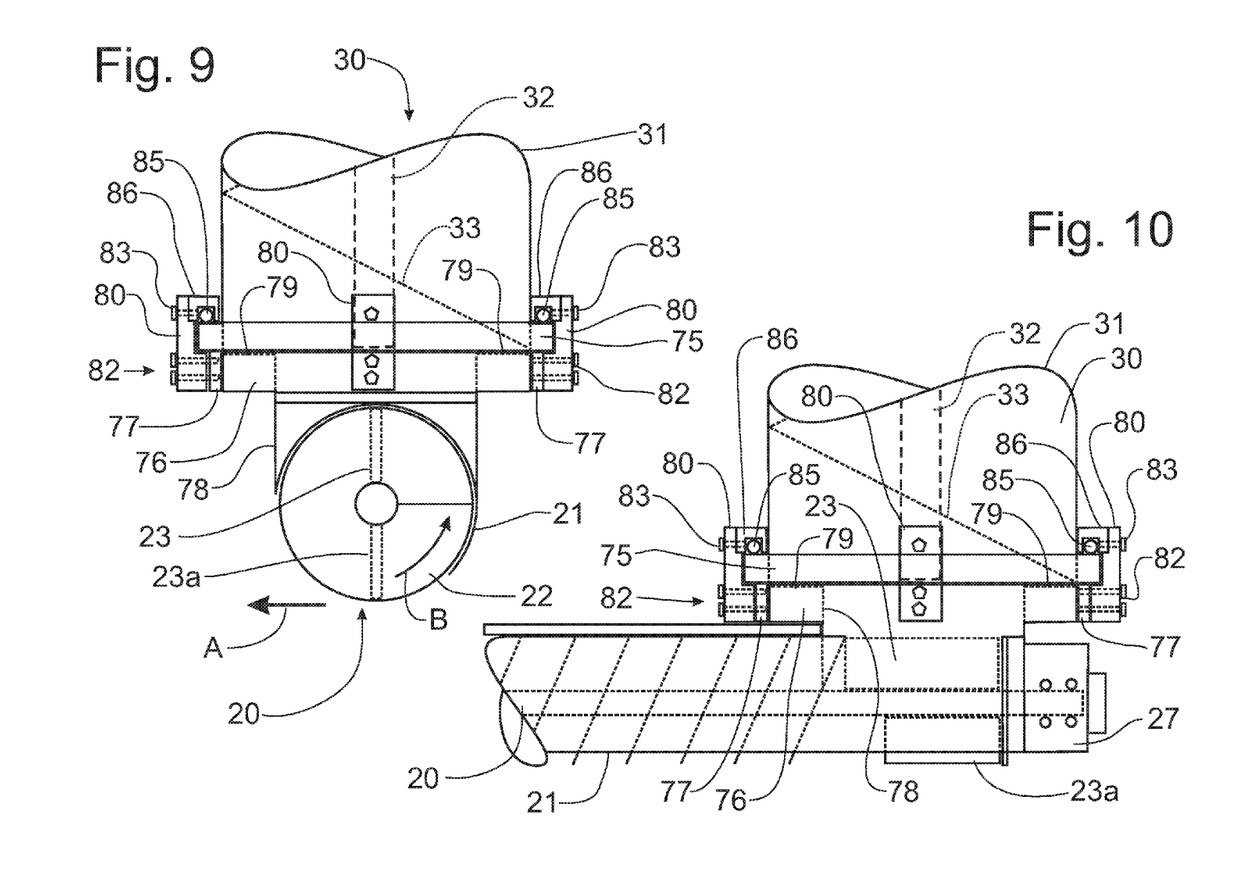
FIG. 9 is a partial cross-sectional view similar to that of FIG. 8, but depicting an alternative embodiment for the mounting of the horizontal silage collection mechanism on the vertical auger housing for rotation relative thereto.
FIG. 10 is a partial side elevational view of the connection between the horizontal silage collection mechanism and the vertical auger showing the alternative embodiment depicted in FIG. 9.

An alternative rotational support of the silage collection mechanism 20 on the housing 31 of the central vertical auger 30 can be seen in FIGS. 9 and 10. The lower end of the housing 31 is formed with a flange 75 that projects outwardly from the cylindrical body of the housing 31. The housing 21 for the horizontal auger 22 is also formed with a flared housing 76 that mates against the flange 75. The flared housing 76 has mounting blocks 77 secured thereto, such as by welding, to enable the connection thereto of a mounting bracket 80 at multiple places around the periphery of the flange 75, for example at four locations spaced 90 degrees around the flange 75. Preferably, the lower portion of each of the mounting bracket 80 is detachably connected to the corresponding mounting block 77 by fasteners 82. The upper portion of the mounting bracket 80 supports a roller 85 that rides on top of the flange 75 to rotatably support the flared housing 76 on the flange 75 to enable the horizontal silage collection mechanism 20 to rotate around the vertical auger 30 with the axis of rotation coinciding with the vertical auger shaft 32.

The upper portion of the mounting bracket 80 can be formed in two parts with a hub 86 capturing the roller 85 being connected to the upper portion of the mounting bracket 80 by a third fastener 83. The third fastener 83 permits the hub 86 to be removed from the mounting bracket 80 to facilitate the repair or replacement of the roller 85 without detaching the mounting bracket 80 from the flared housing 76. As previously noted, the periphery of the horizontal auger 22 is preferably formed with teeth (not shown) or some form of biting edge that will aggressively dislodge silage material from the compacted silage 3 within the silo 1. Similarly, the outer edge of both the primary auger paddle 23 and the secondary auger paddle 23a will also be formed with teeth (best shown in FIG. 3) to dislodge silage material.

The flared housing 76 is shaped to facilitate the discharge of the collected silage material upwardly by the auger paddles 23, 23a into the vertical auger 30. Specifically, the flared housing 76 will form a box 78 with vertical sides extending upwardly from the widest part of the auger housing 21 toward the bottom of the central auger 30. One skilled in the art will note that the bottom of the vertical auger 30 has a larger diameter than the horizontal auger 22. Specifically, the vertical auger will have a diameter of 24 inches, while the horizontal auger can be from 12 to 16 inches in diameter. The box 78 then will be approximately 16 inches square, as depicted in FIGS. 9 and 10, which leaves crescent areas outboard of the box 78 that are covered by caps 79 to prevent the loss of silage material between the horizontal and vertical augers 30, 22. Preferably the upper peripheral edge of the auger paddles 23, 23a as the paddles 23, 23a rotate with the auger 22 is spaced below the lowermost edge of the rotating vertical auger 30 by 3-4 inches to facilitate the loading of the collected silage material from the horizontal auger 22 to the vertical auger 30.

A schematic layout of the electrical wiring 60 for the silo unloader 10 can also be seen in FIG. 6. The main wire 60a delivers electrical power to a junction box 61 mounted on an upper portion of the housing 31 so as to be stationary. From the junction box 61, a wire 62 delivers electricity to the motor 37 for the central vertical auger 30, a wire 63 delivers electricity to the belt conveyor motor 47, and a wire 64 delivers electricity to the circular carrier 55. The silage collection mechanism 20 also includes a power flange 65 that rotates with the silage collection mechanism 20 about the central vertical auger 30. The power flange 65 is in contact with the circular carrier 55 to receive electricity therefrom as the power flange 65 rotates around the circular carrier 55. A wire 66 delivers electricity from the power flange 65 to the horizontal auger motor 27, while a wire 67 is carried by the housing 21 for the horizontal auger 22 to provide electricity to the track drive motor 19.

During experimentation, Applicant has found that a vertical auger having a diameter of 24 inches with a flighting height of 24 inches having a single 360 degree flight elevates collected silage adequately to a discharge paddle having a 12 inch height dimension for discharge to a belt conveyor. An electric motor having 3-5 HP provided sufficient power to operate the central vertical auger at a speed of approximately 60 RPM or more, while a 10-15 HP electric motor, preferably with variable drive speed, would power the operation of the auger 22 in the silage collection mechanism 20 at a rotation faster than the vertical auger (between 60 and 120 RPM), and a 2 HP electric motor would power the operation of an 18 inch wide belt conveyor 40. The screw jack 70 must be disconnected from the support frame 12, 15 after the belt conveyor 40 has been properly aligned. Accordingly, the threaded bracket 73 mounting the screw jack 70 to the frame of the belt conveyor 40 is preferably on a swivel mount, while the base bracket 71 can be pinned by the pin 72 to the frame of the belt conveyor 40 so that the belt conveyor 40 is free to pivot about the horizontal pivot 41.

In operation, the silo unloader 10 is lowered from a storage position within the dome (not shown) of a silo 1 by operation of a winch (not shown) coupled to the tri-mount frame 11 by cables 13 connected to the distal ends of the tri-mount frame members 12. The silo unloader 10 is lowered onto the top surface of the compacted supply of silage material 3 stored within the silo structure 1. Once supported on the top of the compacted silage 3, the operator climbs the silo structure 1 using a ladder (not shown) typically located within the silo chute 5 to open a selected one of the doors 6 that is positioned above the top surface of the silage material 3 on which the silo unloader 10 is now positioned. The operator would then manipulate the screw jack 70 (or other appropriate mechanism for moving the belt conveyor 40) to raise the belt conveyor from the storage position resting on the support 14 until the belt conveyor 40 and the support apparatus 50 at the end of the belt conveyor 40 are aligned with a selected door 6. The selected door 6 is then opened and the hook portion is placed over the sill 7 at the opening for the selected door 6. Since the support apparatus 50 is connected to the distal end of the belt conveyor 40, the belt conveyor 40 will pivot about the pivot axis 41 and, thereby, be aligned with the opened door 6.

The silo unloader 10 is then in position to start operating, whereupon the operator will provide a flow of electricity through the wiring 60 for distribution through the circular carrier and to the electrical motors 19, 27, 37 and 47. Once powered, the silage collection mechanism 20 starts rotation of the auger 22, as well as the scraper member 25, to loosen silage material from the top surface of the supply of compacted silage 3 and to clean any remnant silage remaining along the inside surface of the silo structure 1. In addition, the rotary truck 18 is powered to start a slow rotation of the silage collection apparatus 20 along the circular track 17 about the central pivot axis 32. In this manner, the silage collection apparatus 20 will collect silage material around the entire top surface of the compacted supply of silage 3 in a continuous manner as the silage collection apparatus 20 is rotated. As reflected in FIG. 9, the housing 21 for the horizontal auger 20 is open on the lower side in the direction of movement of the silage collection mechanism 20, as indicated by the arrow A, while the auger 22 rotates counter to the direction of movement, which rotation is indicated by the arrow B.

As the silage collection mechanism 20 is rotated about the central pivot axis 32 along the circular track 17, the auger paddles 23, 23*a* at the inner end of the auger 22 sends the collected silage delivered by the auger 22 upwardly into the housing 31 of the central vertical auger 30 where the flighting 33 engages the silage material and elevates the silage material to the paddle member 35. The paddle member 35 sends the collected silage material outwardly through an opening 36 in the housing 31 onto the conveyor belt 42, whereupon the rotating conveyor belt 42 carries the collected silage toward the selected door opening 6. If the rotational speed of the conveyor belt 42 is sufficient to propel the collected silage toward the opened door 6, the distal end of the belt conveyor 40 can terminate short of the door opening 6. Assuming that the support apparatus 50 is properly oriented to aim the propelled silage from the distal end of the conveyor belt 42 through the door opening 6, the collected silage will impact the chute 5 and fall to the bottom of the silo chute 5 where the silage can be gathered to feed the animals as desired. The operating speed of the conveyor belt 42 can be lowered if the distal end of the belt conveyor 40 overlaps the opened door sill 7, whereupon the silage will simply drop off the end of the conveyor belt 42 and fall to the bottom of the chute 5.

The position of the distal end of the belt conveyor 40 changes as the silo unloader 10 collects silage from the top surface of the compacted supply of silage 3. The removal of a layer of silage from the top surface of the supply 3 causes the tri-mount frame 11 and the components of the silo unloader 10 supported therefrom to lower progressively. Because the support apparatus 50 is fixed to the door opening 6 and because the screw jack 70 is unpinned from the support frame 12, 15, the lowering of the silo unloader 10 will cause the belt conveyor 40 to pivot about the pivot axis 41 and increase the angle of the belt conveyor 40 relative to horizontal. This increasing angle of the belt conveyor 40 causes the distal end of the belt conveyor 40 to move inwardly away from the door opening 6, thereby increasing the distance over which the collected silage must be propelled. Since the support apparatus 50 remains engaged to the silo structure 1 and the opened door 6, the belt conveyor 42 will remain oriented to direct collected silage toward the opened door 6 and into the chute 5.

Eventually, the level of the top surface of the compacted supply of silage 3 drops sufficiently that another door 6 is available. At this time, the angle of the belt conveyor 40 may be approaching limits of efficiency, particularly with regard to propelling the collected silage through the opened door 6. Accordingly, the operation of the silo unloader 10 should be halted at this point. The operator would then reclimb the silo ladder (not shown) and enter the interior of the silo through the open door 6. The operator would then remove the support apparatus 50 from the selected door opening 6 and, utilizing a re-connected screw jack 70, relocate the support apparatus 50 to the next lower available door 6 to be opened. Once relocated, the belt conveyor 40 will be oriented at a shallower angle and the distal end will be closer to the opened door 6. Repositioning of the belt conveyor 40 is desirable as the silo unloader 10 lowers the top surface of the compacted silage material 3 to expose a new door 6 for access to the chute 5.

Once a sufficient supply of collected silage has been delivered to the bottom of the silo chute 5, the power through the electrical wiring 60 can be shut off and re-initiated when more silage is needed. In the event more silage material is to be added to the silo 1, such as during harvesting season, the winch (not shown) can be operated to pull the silo unloader 10 back to a storage position in the dome of the silo 1. One skilled in the art will recognize that the belt conveyor 40 would need to be oriented into a storage position. To reorient the belt conveyor 40 into this storage position, the operator would disengage the support apparatus 50 from the silo structure 1 and retract the support mechanism 50 along the brackets 52. Using the reconnected screw jack 70, the belt conveyor 40 can then be lowered to a generally horizontal position wherein the frame of the belt conveyor 40 will rest on the support arm 14 projecting outwardly from the adjacent tri-mount member 12.

The provision of a belt conveyor 40 to transport the collected silage to the chute 5 allows the silo unloader 10 to be adapted to the particular size, i.e. diameter, of the silo structure 10. Accordingly, the size of the silo diameter is no longer limited to the ability of a blower to reach the opened door to the silo chute, or to the dispersal of the blown silage because the distance from the blower spout to the opened door is too large to maintain a tightly controlled stream of silage. The silo unloader 10, according to the principles of the instant invention, can be equipped with a belt conveyor 40 that has a length to match approximately the radius of the silo structure 1. The use of a central vertical auger 30 to elevate the collected silage to the belt conveyor 40 solves a number of disadvantages of current silo unloader configurations, including the buildup of a central plug of silage material caused by the rotation of the silage collection mechanism and the feeding of the collected silage into a blower. In the instant silo unloader 10, the silage collection mechanism 20 rotates about the axis of the shaft 32 of the vertical auger 30 and consistently feeds collected silage into the open bottom of the housing 31, 360 degrees around the housing to accommodate the full rotation of the silage collection mechanism 20.

One skilled in the art will recognize that the utilization of the central vertical auger 30 in cooperation with the rotating silage collection mechanism 20 can be utilized with a silo unloader configuration that incorporates a blower instead of a belt conveyor 40. In such an embodiment, the discharge of the collected silage material by the paddle member 35 from the housing 31 of the vertical auger 30 would be directed or otherwise conveyed into the inlet opening of the blower, which could be accomplished by an additional auger and/or deflector structure.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A top mounted silo unloader, comprising:
    a support frame;
    a silage collection mechanism supported from said support frame, said silage collection mechanism including a horizontal collection auger for dislodging and collecting silage material from a supply of silage material within a silo, said silage collection mechanism being operatively connected to a circular track to guide rotation of said silage collection mechanism about a central vertical pivot axis;
    a central vertical auger positioned above an inner end of said silage collection mechanism to receive collected silage material from said auger, said central vertical auger having a vertically oriented shaft corresponding to said central vertical pivot axis of said silage collection mechanism, said central vertical auger having a first portion that includes a spiral flighting member mounted on said shaft to elevate the collected silage material above said silage collection mechanism and a second portion that includes a paddle member which is an extension of said spiral flighting member and discharges the collected silage material from the central vertical auger, said spiral flighting member having a vertical height dimension that is double a vertical height dimension of said paddle member, said paddle member said single rotation flighting member rotating about said central vertical pivot axis at a common speed of rotation;
    a silage conveying device in flow communication with said central vertical auger to receive collected silage material discharged therefrom and convey said collected silage material for discharge from said silo.

2. The top mounted silo unloader of claim 1 wherein said silage conveying device is a belt conveyor having an adjacent end to receive collected silage material from said central vertical auger and a distal end aligned with an opening in said silo.

3. The top mounted silo unloader of claim 2 wherein said belt conveyor is pivotally supported for movement about a generally horizontal pivot axis to permit a change in a vertical repose angle of said belt conveyor.

4. The top mounted silo unloader of claim 3 wherein said belt conveyor includes a support apparatus connected to said distal end of said belt conveyor, said support apparatus being engagable with said silo to retain said distal end of said belt conveyor in alignment with an opening in said silo for discharge of silage therefrom.

5. The top mounted silo unloader of claim 4 wherein said support apparatus is slidable relative to said belt conveyor to accommodate changes in said vertical repose angle as said silage collection mechanism collects silage from said supply of silage.

6. The top mounted silo unloader of claim 5 wherein said belt conveyor includes a mechanism selectively cooperable with said support frame to effect pivotal movement of said belt conveyor about said horizontal pivot axis.

7. The top mounted silo unloader of claim 1 wherein said central vertical auger includes a discharge paddle mounted on said vertical shaft to discharge collected silage material elevated by said vertical auger through an opening in a housing for said central vertical auger to be received by said silage conveying device.

8. The top mounted silo unloader of claim 7 wherein said silage collection mechanism includes a frame mounted on said central vertical auger housing to permit rotation of said silage collection mechanism about said vertical shaft of said central vertical auger.

9. The top mounted silo unloader of claim 8 wherein said central vertical auger has a diameter that is substantially equal to a height dimension of said flighting member, said discharge paddle being mounted on said vertical shaft above said flighting member.

10. A top mounted silo unloader comprising:
    a support frame;
    a silage collection mechanism supported from said support frame, said silage collection mechanism including horizontal collection auger for dislodging and collecting silage material from a supply of silage material within a silo, said silage collection mechanism being operatively connected to a circular track to guide rotation of said silage collection mechanism about a central vertical pivot axis;
    a central vertical auger positioned above an inner end of said silage collection mechanism to receive collected silage material from said auger, said central vertical auger having a vertically oriented shaft corresponding to said central vertical pivot axis of said silage collection mechanism, said central vertical auger having a first portion that includes a spiraled flighting member mounted on said shaft that elevates the collected silage material above said silage collection mechanism and a second portion that includes a paddle member affixed to the shaft and forming an extension of said spiraled flighting member to convey the collected silage material from the central vertical auger, said spiraled flighting member being formed as a single rotation flighting making only a full 360 degree flight rotation before terminating in said paddle member, said flighting member and said paddle member rotating at a common speed of rotation;
    a belt conveyor in flow communication with said central vertical auger to receive collected silage material therefrom and convey said collected silage material for discharge from said silo.

11. The top mounted silo unloader of claim 10 wherein said belt conveyor is pivotally supported for movement about a generally horizontal pivot axis to permit a change in a vertical repose angle of said belt conveyor.

12. The top mounted silo unloader of claim 11 wherein said belt conveyor includes a slidable support apparatus connected to said distal end of said belt conveyor, said support apparatus being selectively engagable with said silo to retain said distal end of said belt conveyor in alignment with an opening in said silo for discharge of silage therefrom, said support apparatus being slidable relative to said belt conveyor to accommodate changes in said vertical repose angle as said silage collection mechanism collects silage from said supply of silage.

13. The top mounted silo unloader of claim 12 wherein said belt conveyor includes a mechanism selectively cooperable with said support frame to effect pivotal movement of said belt conveyor about said horizontal pivot axis.

14. In a top mounted silo unloader having a support frame; a silage collection mechanism supported from said support frame, said silage collection mechanism including an auger for dislodging and collecting silage material from a supply of silage material within a silo; and a silage conveying device in flow communication with said silage collection mechanism to convey the collected silage material for discharge from said silo, the improvement comprising:

a central vertical auger positioned above an inner end of said silage collection mechanism to receive collected silage material from said auger, said central vertical auger having a housing including an upper portion and a lower portion and a vertically oriented shaft corresponding to a central vertical pivot axis for the rotation of said silage collection mechanism, said vertical shaft having a spiral flighting affixed thereto to elevate the collected silage, said spiral flighting terminating in a discharge paddle to discharge said elevated collected silage material to said silage conveying device through an opening in said upper portion of said housing, said spiral flighting and said discharge paddle rotating at a common speed of rotation.

15. The top mounted silo unloader of claim 14 wherein said silage collection mechanism includes a frame mounted on said lower portion of said central vertical auger housing to permit rotation of said silage collection mechanism about said vertical shaft of said central vertical auger.

16. The top mounted silo unloader of claim 15 wherein said silage conveying device is a belt conveyor having an adjacent end to receive collected silage material from said central vertical auger and a distal end aligned with an opening in said silo, said belt conveyor being pivotally supported for movement about a generally horizontal pivot axis to permit a change in a vertical repose angle of said belt conveyor.

17. The top mounted silo unloader of claim 16 wherein said belt conveyor includes a slidable support apparatus connected to said distal end of said belt conveyor, said support apparatus being selectively engagable with said silo to retain said distal end of said belt conveyor in alignment with an opening in said silo for discharge of silage therefrom, said support apparatus being slidable relative to said belt conveyor to accommodate changes in said vertical repose angle as said silage collection mechanism collects silage from said supply of silage.

18. In a top mounted silo unloader having a support frame; a silage collection mechanism supported from said support frame, said silage collection mechanism including a horizontally disposed collection auger for dislodging and collecting silage material from a supply of silage material within a silo; and a silage conveying device in flow communication with said silage collection mechanism to convey the collected silage material for discharge from said silo, the improvement comprising:

said silage conveying device is a belt conveyor having an adjacent end to receive collected silage material and a distal end aligned with an opening in said silo; and a central vertical auger is positioned above the adjacent end of said silage collection mechanism to receive collected silage material from said collection auger, said central vertical auger including a housing having an upper portion and a lower portion, and a vertically oriented shaft corresponding to a central vertical pivot axis for the rotation of said silage collection mechanism, said lower portion of said housing corresponding to a single rotation spiral flighting member terminating in a paddle member corresponding to said upper portion of said housing, said paddle member of said central vertical auger discharging the collected silage material through an opening in said upper portion of said housing to said belt conveyor, said silage collection mechanism being rotatably mounted on said lower portion of said housing.

19. The silo unloader of claim 18 wherein said belt conveyor defines a longitudinal axis that extends along a length dimension of the belt conveyor, said vertically oriented shaft of said central vertical auger being offset from said longitudinal axis of said belt conveyor.

* * * * *